United States Patent [19]
Lee

[11] Patent Number: 6,135,468
[45] Date of Patent: Oct. 24, 2000

[54] FRONT-WHEEL DRIVE AUTOMOBILE HAVING RUN-FLAT TIRES

[76] Inventor: Frederick A. Lee, 682 Broadway, New York, N.Y. 10012

[21] Appl. No.: 09/059,493

[22] Filed: Apr. 13, 1998

[51] Int. Cl.[7] .................................................. B62D 21/00
[52] U.S. Cl. ........................................ 280/80.1; 152/516
[58] Field of Search ................... 280/80.1, 781; 152/152, 520, 576, 517, 518, 519, 521, 522; 180/312

[56] References Cited

U.S. PATENT DOCUMENTS

| | | | |
|---|---|---|---|
| 889,143 | 5/1908 | Munroe | 180/21 |
| 1,210,055 | 12/1916 | Fairman | 180/21 |
| 1,268,960 | 6/1918 | Goodhart | 180/21 |
| 1,560,042 | 11/1925 | Davison | 180/21 |
| 2,304,443 | 12/1942 | Butler | 180/21 |
| 2,606,623 | 8/1952 | Vickers | 180/21 |
| 3,173,396 | 3/1965 | Bradov | 280/52 |
| 3,589,211 | 6/1971 | Douglas | 74/752 |
| 3,941,199 | 3/1976 | Williams | 180/44 |
| 3,974,018 | 8/1976 | Arimura et al. | 156/394 |
| 3,986,267 | 10/1976 | Taylor | 33/143 |
| 4,059,138 | 11/1977 | Mirtain et al. | 152/330 |
| 4,144,652 | 3/1979 | Romak | 33/203.2 |
| 4,281,700 | 8/1981 | Ross | 152/158 |
| 4,673,064 | 6/1987 | Will | 188/18 |
| 4,967,817 | 11/1990 | Boehmer et al. | 152/209 |
| 5,078,223 | 1/1992 | Ishiwatari et al. | 180/68.1 |
| 5,251,713 | 10/1993 | Enokimoto | 180/68.4 |
| 5,435,363 | 7/1995 | Pender | 152/158 |
| 5,439,151 | 8/1995 | Clayton | 224/509 |
| 5,464,234 | 11/1995 | Ferguson | 280/5.32 |

*Primary Examiner*—Kevin Hurley
*Assistant Examiner*—Andrew J. Fischer
*Attorney, Agent, or Firm*—Hopgood, Calimafde Kalil & Judlowe

[57] ABSTRACT

An automobile having a pair of front wheels and a pair of rear wheels provided with run-flat tires. The front tired wheels which are steerable are driven through a power transmission by an engine housed between these wheels. The tired front wheels are relatively narrow in width to make room for a large engine and are relatively large in diameter to afford a more favorable power transmission ratio and improved steering control. The tired rear-wheels are broad in width and small in diameter to enhance the tire-to-road surface area for more effective braking and to allow for an enlarged trunk capacity.

6 Claims, 1 Drawing Sheet

FRONT-WHEEL DRIVE AUTOMOBILE HAVING RUN-FLAT TIRES

BACKGROUND OF INVENTION

1. Field of Invention

This invention relates generally to automobiles whose wheels have mounted thereon extended mobility tires, making it possible for the vehicle to run with a flat tire, and more particularly to a vehicle of this type whose tired front wheels have a width and a diameter which differ from those of the tired rear wheels whereby the automobile runs more efficiently than an automobile having four like tired wheels.

2. Status of Prior Art

Automobile is a generic term which encompasses various types of vehicles having a pair of front wheels and a pair of rear wheels, such as passenger cars, station wagons, taxis and vans. The wheels of an automobile are provided with pneumatic tires; hence when a conventional tire is punctured it loses air and goes flat, at which point the flat tire starts flapping on its rim. Since a car having a flat tire cannot continue to run, the flat tire must be replaced with an inflated tire in order to resume operation.

It is for this reason that every automobile now carries in its trunk or elsewhere in the vehicle a spare tire. The replacement of a flat tire at the side of a heavily-travelled road can be a dangerous experience, particularly at night, for one has to jack up the car under difficult conditions, detach the wheel having the flat tire from its axle, and then mount the spare tire thereon.

The need for a spare tire to replace a flat tire dictates that all four tired wheels in the car be identical, otherwise one could not replace whichever one of the front and rear wheels went flat. And since all four wheels of the automobile must be identical, this precludes an automobile tire configuration having wheels which differ in diameter and width.

Thus if one were to construct a motor vehicle of the type shown in the Eisenhuth patent 660,396, having front wheel tires whose diameter is smaller than the diameter of the rear wheel tires, or construct a vehicle of the type shown in the Turner U.S. Pat No. 2,046,042 in which the front wheel tires have a greater diameter than the rear wheel tires, these vehicles could not be provided with a single spare tire. It would be necessary instead to provide a first spare matching the front wheel tires, and a second spare matching the rear wheel tires.

A recent innovation in tire design is of practical significance, for it does away entirely with the need to provide an automobile with a spare tire. This innovative tire, known as an extended mobility tire, is now commercially available as Goodyear's Eagle FV-GS tire and as Michelin's MXV4ZP (Zero-Pressure) tire.

An extended mobility tire, more popularly known as a run-flat tire, has thicker and stiffer sidewalls than a conventional pneumatic tire, and is able therefore to support the weight of the car and its driving dynamics even without air pressure. These run-flat tires are designed to run up to 200 miles at 55 mph with zero air pressure. Thus should a run-flat tire on a vehicle go flat, the vehicle can continue to be driven until a repair station is found that can repair and reinflate the tire.

Extended mobility tires not only dispense with the need for a spare tire, but also with the need for a hydraulic or mechanical jack and other tools stored in the trunk of the automobile which a spare tire make necessary. As a consequence, more room is now available in the trunk. And these run-flat tires relieve the owner of an automobile of the burden of changing flat tire.

But an unexpected advantage of extended mobility tires is that since it does away with the need for a spare tire it also cancels the requirement that the front wheels of the car match its rear wheels.

The introduction of run-flat tires now makes it possible to so configure the front and rear wheels of a car so that they more efficiently perform their assigned functions. Thus when the wheels in the car are steerable, its design must take into account the difficulties which are encountered when changing wheel direction. And when wheels are to be braked, one must consider the ability of these wheels to frictionally engage the road surface and thereby arrest movement of the vehicle.

SUMMARY OF INVENTION

In view of the foregoing, the main object of this invention is to provide an automobile whose wheels have extended mobility tires mounted thereon, the pair of tired front wheel differing in diameter and width from the pair of tired rear wheels whereby the automobile runs more efficiently than a vehicle having four identical tired wheels.

More particularly, an object of this invention is to provide an automobile of the above type in which the tired front wheels are relatively narrow in width and relatively large in diameter, and in which the tired rear wheels are broad in width and small in diameter.

Also an object of the invention is to provide an automobile of the above type which requires no spare tire and has driving dynamics and performance characteristics superior to those of an automobile having identical tired front and rear wheels.

Briefly stated, these objects are attained by an automobile having a pair of front wheels and a pair of rear wheels provided with run-flat tires. The tired front wheels which are steerable are driven through a power transmission by an engine housed between these wheels. The tired front wheels are relatively narrow in width to make room for a large engine and are relatively large in diameter to afford a more favorable power transmission ratio and improved steering control. The tired rear-wheels are broad in width and small in diameter to enhance the tire-to-road surface area for more effective braking and to allow for an enlarged trunk capacity.

BRIEF DESCRIPTION OF DRAWINGS

For a better understanding of the invention as well as other objects and further features thereof, reference is made to the following detailed description to be read in conjunction with the accompanying drawings, wherein.

DESCRIPTION OF INVENTION

Figure 1:
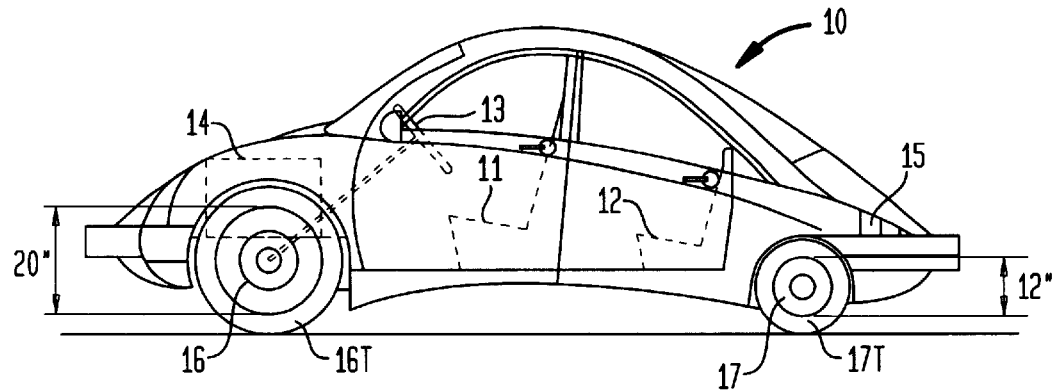
FIG. 1 is an elevational view of an automobile in accordance with the invention.
Figure 2:
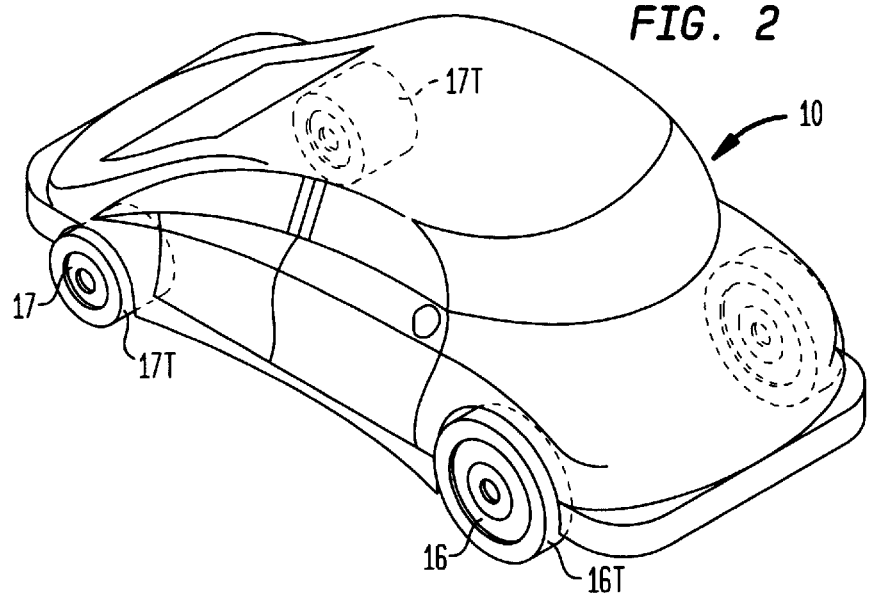
FIG. 2 is a perspective view of the automobile.
Figure 3:
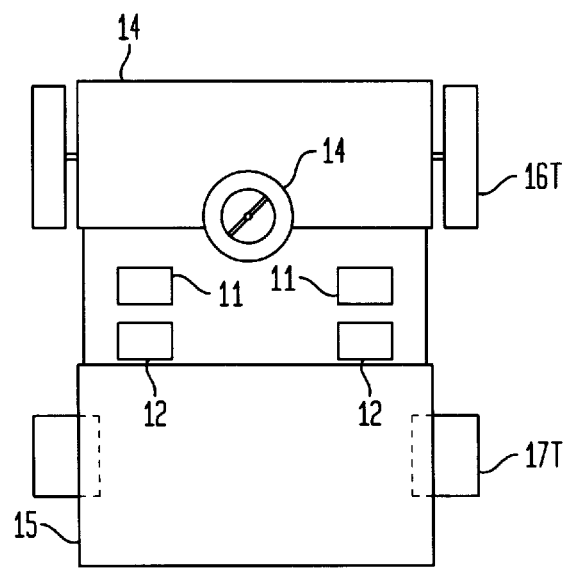
FIG. 3 is a schematic view of the vehicle.

Referring now to FIGS. 1, 2 and 3, shown therein is an automobile 10 having four doors giving access to a driver's front seat 11 and a passenger's rear seat 12, the driver occupying the front seat operating a steering wheel 13. An engine 14 is housed in a front compartment of the vehicle which is provided at its rear end with a trunk 15. The automobile illustrated and its body shape are by way of example only, for the automobile, may take the form of a station wagon or that of any other four wheeled motor-driven vehicle that qualifies as an automobile.

Automobile 10 is provided with a pair of front wheels 16 on which are mounted extended mobility tires 16T. These tires are normally inflated with pressurized air, but are capable of running flat at zero pressure. Also provided is a pair of rear wheels 17 on which are mounted extended mobility tires 17T. Front wheels 16 are relatively narrow in width whereby the space between wheels is capable of accommodating a larger and more powerful engine 14. However, front wheels 16 are relatively large in diameter. Thus in practice, the front wheels may have a width in the range of 6 to 10 inches and a diameter in the range of 17 to 20 inches; depending on the nature of the automobile. For example, a sub-compact auto will have smaller front wheels than a full-sized passenger car.

The larger the diameter of the driven front wheels 16, the greater the circumference of these wheels and that of the tires mounted thereon, and the greater therefore is the road distance traversed for each revolution of these wheels. Power transmission to these large diameter wheels makes possible gear ratios affording better gas mileage and improved control for turns.

Moreover a large diameter front wheel is less sensitive to irregularities in the road surface than a smaller diameter wheel. Thus when a small diameter wheel runs over a sizable rut in the road surface, it may become trapped therein and cause damage to the wheel axle, whereas a larger diameter wheel will simply pass over the rut.

And a driven large diameter front wheel is more easily steered than a small diameter wheel, for in a large diameter wheel only a small percentage of its circumference engages the road surface which then offers little resistance to turning of the wheel toward a new direction of travel.

Rear wheels 17 on which run-flat tires 17T are mounted are relatively broad in width in the range of 12 to 16 inches, and have a small diameter in a range of 10 to 13 inches.

Because the rear wheels are broad, they exhibit an enlarged tire-to-road contact surface area. As a consequence, braking is improved because of the enhanced frictional resistance of the road surface engaged by the tired rear wheels. Rear end flare-outs on tight turns at speed will be reduced, resulting in improved skidpad performance.

Trunk 15 is mounted above the rear wheels and because these wheels have a small diameter, it is possible to provide a more commodious trunk. And since there is no need for a spare tire and a jack, the trunk will have a greater useful capacity than a trunk loaded therewith.

Front Wheel Drive and Braking

In a conventional automobile having identical front and rear wheels in which the rear wheels are driven through a power transmission by an engine, the distribution of weight throughout the automobile is fairly well balanced so that the load imposed on the front wheels is substantially the same as that imposed on the rear wheels. This balanced load is best supported by identical front and rear wheels.

In an automobile in accordance with the invention in which the engine acts through a power transmission to drive the front wheels, the distribution of weight is not balanced, for a larger percentage (about sixty percent) of the load is imposed on the front wheels. But since the front wheels have run-flat tires mounted thereon which have a larger diameter than the like-tired rear wheels, the front and rear wheels are adapted to properly support the unequal loads imposed thereon.

However the ability of front and rear wheels of unequal diameter to more effectively support loads of unequal weight is not the only advantage gained by these wheels.

The usual practice in a standard automobile is to brake the front wheels of this vehicle with a disk brake. In a brake of this type a disk attached to a frame is forced against the rotating wheel housing. With a front wheel having a housing whose diameter is greater than that of a standard wheel, one can then use a disk of greater diameter, thereby enlarging the available surface area for braking.

In a disk brake, the smaller the disk diameter, the greater is the pressure required to effect braking and the higher the resultant heat. With a disk brake for a large diameter front wheel, it takes less pressure to effect a braking action and far less heat is generated.

It is also the usual practice in an automobile to brake the rear wheels with a drum brake in which two curved shoes fitted with heat and wear resistant linings are forced against the surface of a rotating drum. Since in an automobile in accordance with the invention, the rear wheels are wide, they present a large surface area to the shoes of the drum brake and afford more effective drum braking than standard wheels which are relatively narrow.

Thus the introduction of run-flat tires has made possible an automobile whose front wheels have a geometry which differs from that of the rear wheels, and to associate respective brakes with these front and rear wheels which exploit their geometry to provide more effective braking actions.

While there has been shown a preferred embodiment of a front-wheel drive automobile having run-flat tires in accordance with the invention, it is to be understood that many changes may be made thereon within the spirit of the invention.

I claim:

1. A road-running passenger automobile having a passenger compartment, said automobile comprising:
   A. a pair of front wheels having mounted thereon run-flat tires;
   B. a pair of rear wheels having mounted thereon run-flat tires, said front wheels having a width smaller and a diameter greater than those of the rear wheels, the automobile being capable of running when any one or more of the tires is flat, thereby dispensing with the need for a spare tire; and
   C. an engine and a transmission said engine mounted between the front wheels to drive said front wheels through said transmission, said front wheels having a relatively narrow width to accommodate said engine between the front wheels, and having a relatively large diameter to render the front wheels more easily steerable, said pair of rear wheels having a relatively large width to facilitate braking and traction, said pair of front wheels and said pair of rear wheels being rotatable about parallel axles having substantially the same length which length depends on the width of the passenger compartment.

2. An automobile as set forth in claim 1, further including a disk brake having a disk which is forced against a housing of each of said front wheels.

3. An automobile as set forth in claim 1, in which the rear wheels are braked by a drum brake.

4. An automobile as set forth in claim 1, in which the width of the front wheels lies in the range of 6 to 10 inches and the diameter of the front wheels lies in the range of 17 to 20 inches.

5. An automobile as set forth in claim 1, in which the width of the rear wheels lies in a range of 12 to 16 inches and the diameter of the rear wheel lies in a range of 10 to 13 inches.

6. An automobile as set forth in claim 1, further including a steering wheel operatively coupled to said front wheels.

* * * * *